United States Patent
Yamaguchi et al.

(10) Patent No.: US 11,919,581 B2
(45) Date of Patent: Mar. 5, 2024

(54) STEERING CONTROL DEVICE

(71) Applicant: JTEKT CORPORATION, Osaka (JP)

(72) Inventors: Takafumi Yamaguchi, Kuwana (JP);
Takahiro Toko, Takahama (JP);
Nobuaki Kataoka, Okazaki (JP);
Shingo Nitta, Anjo (JP); Yukinobu Ezaki, Kasugai (JP)

(73) Assignee: JTEKT CORPORATION, Kariya (JP)

( * ) Notice: Subject to any disclaimer, the term of this patent is extended or adjusted under 35 U.S.C. 154(b) by 226 days.

(21) Appl. No.: 17/069,994

(22) Filed: Oct. 14, 2020

(65) Prior Publication Data

US 2021/0122413 A1    Apr. 29, 2021

(30) Foreign Application Priority Data

Oct. 24, 2019  (JP) .............................. JP2019-193221

(51) Int. Cl.
  *B62D 5/04*    (2006.01)
  *B62D 15/02*   (2006.01)
(52) U.S. Cl.
  CPC ......... *B62D 5/0481* (2013.01); *B62D 15/024* (2013.01); *B62D 15/0245* (2013.01)
(58) Field of Classification Search
  CPC .......................... B62D 15/024; B62D 15/0481
  See application file for complete search history.

(56) References Cited

U.S. PATENT DOCUMENTS

| | | | | |
|---|---|---|---|---|
| 2010/0121530 | A1* | 5/2010 | Suzuki | B62D 5/0457 701/41 |
| 2012/0330510 | A1* | 12/2012 | Kawase | B62D 5/0469 701/41 |
| 2018/0346018 | A1 | 12/2018 | Kataoka et al. | |
| 2021/0229737 | A1* | 7/2021 | Yamaguchi | B62D 5/0469 |

FOREIGN PATENT DOCUMENTS

| | | |
|---|---|---|
| DE | 10 2012 004 503 A1 | 9/2013 |
| JP | 2005-186926 A | 7/2005 |
| JP | 2016-155519 A | 9/2016 |
| JP | 2017-210216 A | 11/2017 |
| JP | 2019-104476 A | 6/2019 |

OTHER PUBLICATIONS

Mar. 18, 2021 Extended Search Report issued in European Patent Application No. 20202741.3.
Apr. 25, 2023 Office Action issued in Japanese Patent Application No. 2019-193221, with partial translation.

* cited by examiner

*Primary Examiner* — Jess Whittington
(74) *Attorney, Agent, or Firm* — Oliff PLC

(57) ABSTRACT

A steering control device includes an electronic control unit. The electronic control unit is configured to perform end contact relaxation control for correcting a current command value such that a decrease of an end separation angle indicating a distance of an absolute steering angle from an end-position-corresponding angle is limited when the end separation angle is equal to or less than a predetermined angle and to perform partial release control for decreasing a (Continued)

correction value of the current command value due to execution of the end contact relaxation control based on a steering torque which is input to a steering system when a vehicle is intended to travel while turning at the time of execution of the end contact relaxation control.

6 Claims, 5 Drawing Sheets

STEERING CONTROL DEVICE

CROSS-REFERENCE TO RELATED APPLICATION

This application claims priority to Japanese Patent Application No. 2019-193221 filed on Oct. 24, 2019, incorporated herein by reference in its entirety.

BACKGROUND

1. Technical Field

The disclosure relates to a steering control device.

2. Description of Related Art

In the related art, an electric power steering system (EPS) including an actuator with a motor as a drive source is known as a vehicular steering system. As such an EPS, there is an EPS that acquires a steering angle of a steering wheel as an absolute angle including a range exceeding 360° and performs various types of control based on the steering angle. As an example of such control, for example, Japanese Unexamined Patent Application Publication No. 2016-155519 (JP 2016-155519 A) discloses that end contact relaxation control for relaxing an impact of so-called end contact in which a rack end which is an end of a rack shaft comes into contact with a rack housing is performed.

In the EPS described in JP 2016-155519 A, a rack end position at which movement of the rack shaft is physically limited by end contact is correlated with a steering angle and the angle is stored as an end-position-corresponding angle. In the EPS, an impact of end contact is relaxed by decreasing a target value of a motor torque which is output from a motor based on a distance of the steering angle from the end-position-corresponding angle.

SUMMARY

In the configuration according to the related art, movement of the rack shaft may be limited at a virtual rack end position which is closer to a neutral steering position than an actual rack end position at which the rack shaft actually comes into contact with the rack housing by performing end contact relaxation control. In this case, the steering angle is less than that when the rack shaft is located at the actual rack end position. That is, a minimum turning radius when movement of the rack shaft is limited at the virtual rack end position is greater than a minimum turning radius based on the structure of a vehicle. Accordingly, there is concern of deterioration in small-turn performance of a vehicle due to execution of end contact relaxation control when the vehicle travels while turning.

The disclosure provides a steering control device that can curb deterioration in small-turn performance of a vehicle.

According to an aspect of the disclosure, there is provided a steering control device for a steering system including a housing, a turning shaft which is accommodated in the housing such that the turning shaft is able to reciprocate, and an actuator which applies a motor torque for causing the turning shaft to reciprocate using a motor as a drive source, the steering control device including an electronic control unit. The electronic control unit is configured to detect an absolute steering angle which is a rotation angle of a rotation shaft which is able to be converted into a turning angle of turning wheels connected to the turning shaft and which is expressed as an absolute angle including a range exceeding 360°, to calculate a current command value corresponding to a target value of the motor torque which is output from the motor, to control activation of the motor such that an actual current value which is supplied to the motor reaches the current command value, to store an end-position-corresponding angle which is an angle indicating an end position at which movement of the turning shaft is limited due to end contact in which the turning shaft comes into contact with the housing and which is correlated with the absolute steering angle, to perform end contact relaxation control for correcting the current command value such that a decrease of an end separation angle indicating a distance of the absolute steering angle from the end-position-corresponding angle is limited when the end separation angle is equal to or less than a predetermined angle, and to perform partial release control for decreasing a correction value of the current command value due to execution of the end contact relaxation control based on a steering torque which is input to the steering system when a vehicle is intended to travel while turning at the time of execution of the end contact relaxation control.

With this configuration, when a driver intends to cause the vehicle to travel while turning at the time of execution of end contact relaxation control, the correction value for correcting the current command value is decreased by performing partial release control. Accordingly, limitation of the current command value in execution of end contact relaxation control is partially released and the current command value is increased. Accordingly, for example, even when movement of the turning shaft is limited at a virtual end position by execution of end contact relaxation control and a driver intends to cause the vehicle to travel while turning, partial release control is performed and the current command value is increased. Accordingly, it is possible to move the turning shaft to an actual end position. As a result, it is possible to curb a decrease in small-turn performance of the vehicle. With this configuration, since the correction value is decreased based on the steering torque, that is, the current command value is increased, it is possible to prevent a driver from feeling discomfort due to execution of partial release control.

In the steering control device, the electronic control unit may be configured to calculate a steering angle limit value which decreases with a decrease of the end separation angle when the end separation angle is equal to or less than the predetermined angle, to perform the end contact relaxation control by limiting an absolute value of the current command value to the steering angle limit value, to calculate an angle limiting component which decreases with an increase of the end separation angle and calculate the steering angle limit value based on a value which is obtained by subtracting the angle limiting component from a rated current of the motor, and to calculate the angle limiting component such that the angle limiting component decreases at the time of execution of the partial release control in comparison with a case in which the partial release control is not performed.

With this configuration, since end contact relaxation control is performed such that the current command value is limited to a value equal to or less than the steering angle limit value, the correction value of the current command value due to execution of end contact relaxation control decreases as the steering angle limit value increases. Since the steering angle limit value is calculated based on a value obtained by subtracting the angle limiting component from the rated current, the steering angle limit value increases with a decrease of the angle limiting component. Accordingly, by decreasing the angle limiting component, it is possible to easily perform partial release control for decreasing the correction value of the current command value.

In the steering control device, the electronic control unit may be configured to calculate a target steering velocity based on the steering torque using a model formula for correlating the steering torque with the rotation angle at the time of execution of the partial release control, to calculate an offset steering angle based on a value which is obtained by integrating the target steering velocity, and to decrease the angle limiting component based on the offset steering angle.

With this configuration, the offset steering angle reaches a value close to the rotation angle of the rotation shaft which is caused when the steering torque is input to a model indicated by a model formula. Accordingly, by decreasing the angle limiting component based on the offset steering angle, it is possible to suitably increase the current command value such that a steering feeling corresponding to the model is realized.

In the steering control device, the electronic control unit may be configured to calculate the steering angle limit value such that the steering angle limit value is not equal to or greater than a preset limitation threshold value at the time of execution of the partial release control.

With this configuration, it is possible to curb an excessive increase of the current command value due to execution of partial release control. Accordingly, for example, when end contact in which the turning shaft comes into contact with the housing occurs with execution of partial release control, it is possible to curb an increase in impact thereof.

According to the disclosure, it is possible to curb deterioration in small-turn performance of a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
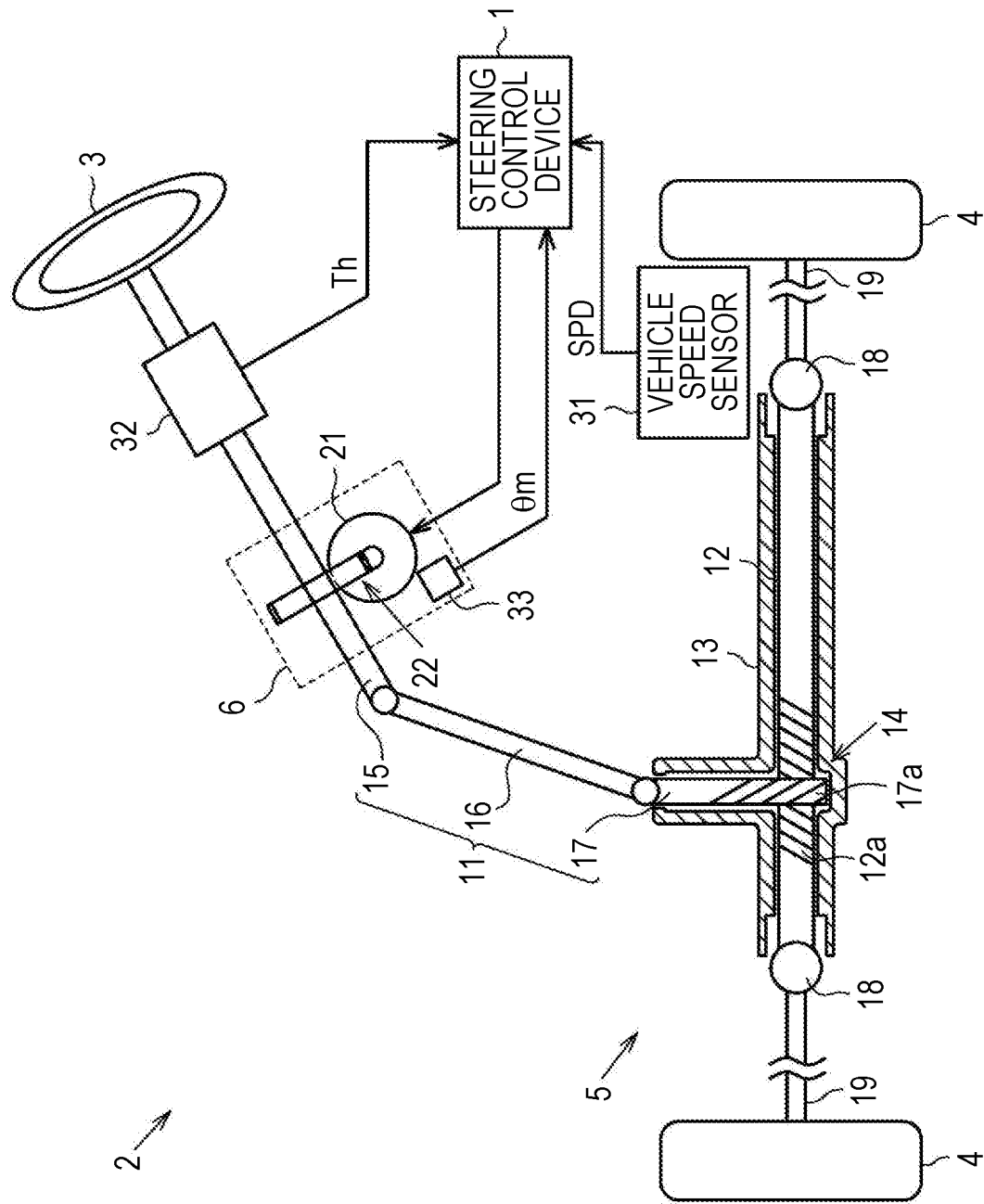
FIG. 1 is a diagram schematically illustrating a configuration of an electric power steering system.

Hereinafter, a steering control device according to a first embodiment of the disclosure will be described with reference to the accompanying drawings. As illustrated in FIG. 1, an electric power steering system (EPS) 2 which is a steering system to be controlled by a steering control device 1 includes a steering mechanism 5 that turns turning wheels 4 based on a driver's operation of a steering wheel 3. The EPS 2 further includes an EPS actuator 6 which is an actuator that applies an assist force for assisting with a steering operation to the steering mechanism 5.

The steering mechanism 5 includes a steering shaft 11 to which the steering wheel 3 is fixed, a rack shaft 12 which is a turning shaft connected to the steering shaft 11, a rack housing 13 which is a housing into which the rack shaft 12 is inserted such that it can reciprocate, and a rack and pinion mechanism 14 that converts a rotational motion of the steering shaft 11 to a translational motion of the rack shaft 12. The steering shaft 11 has a configuration in which a column shaft 15, an intermediate shaft 16, and a pinion shaft 17 are connected sequentially from the side on which the steering wheel 3 is located.

The rack shaft 12 and the pinion shaft 17 are arranged with a predetermined crossing angle in the rack housing 13. The rack and pinion mechanism 14 has a configuration in which rack teeth 12a formed on the rack shaft 12 and pinion teeth 17a formed on the pinion shaft 17 engage with each other. Tie rods 19 are rotatably connected to both ends of the rack shaft 12 via rack ends 18 of which each is formed of a ball joint provided at each shaft end. The tips of the tie rods 19 are connected to knuckles (not illustrated) to which the turning wheels 4 are assembled. Accordingly, in the EPS 2, a rotational motion of the steering shaft 11 based on a steering operation is converted to a translational motion in an axial direction of the rack shaft 12 by the rack and pinion mechanism 14 and the translational motion in the axial direction is transmitted to the knuckles via the tie rods 19, whereby a turning angle of the turning wheels 4, that is, a travel direction of a vehicle, is changed.

A position of the rack shaft 12 at which the rack end 18 comes into contact with the left end of the rack housing 13 is a position at which the steering wheel 3 can be maximally steered to the right side, and this position corresponds to a rack end position which is a right end position. A position of the rack shaft 12 at which the rack end 18 comes into contact with the right end of the rack housing 13 is a position at which the steering wheel 3 can be maximally steered to the left side, and this position corresponds to a rack end position which is a left end position.

The EPS actuator 6 includes a motor 21 which is a drive source and a reduction gear mechanism 22 such as a worm and wheel. The motor 21 is connected to the column shaft 15 via the reduction gear mechanism 22. The EPS actuator 6 applies a motor torque as an assist force to the steering mechanism 5 by reducing a rotational motion of the motor 21 using the reduction gear mechanism 22 and transmitting the reduced rotation to the column shaft 15. A three-phase brushless motor is employed as the motor 21 according to this embodiment.

The steering control device 1 is connected to the motor 21 and controls the operation thereof. The steering control device 1 includes an electronic control unit (ECU) which is not illustrated. The electronic control unit includes a central processing unit (CPU) and a memory which are not illustrated and the CPU executes a program stored in the memory every predetermined calculation cycle. Accordingly, various types of control are performed.

A vehicle speed sensor 31 that detects a vehicle speed SPD of the vehicle and a torque sensor 32 that detects a steering torque Th which is applied to the steering shaft 11 according to a driver's steering are connected to the steering control device 1. A rotation sensor 33 that detects a rotation angle θm of the motor 21 as a relative angle in a range of 360° is connected to the steering control device 1. For example, the steering torque Th and the rotation angle θm are detected as positive values when the steering wheel 3 is steered to the right side and are detected as negative values when the steering wheel 3 is steered to the left side. A yaw rate sensor 34 that detects a yaw rate y of the vehicle is connected to the steering control device 1. The steering control device 1 controls the operation of the EPS actuator 6, that is, an assist force which is applied to the steering mechanism 5 such that the rack shaft 12 can move to reciprocate, by supplying drive power to the motor 21 based on signals indicating state quantities which are input from the sensors.

Figure 2:
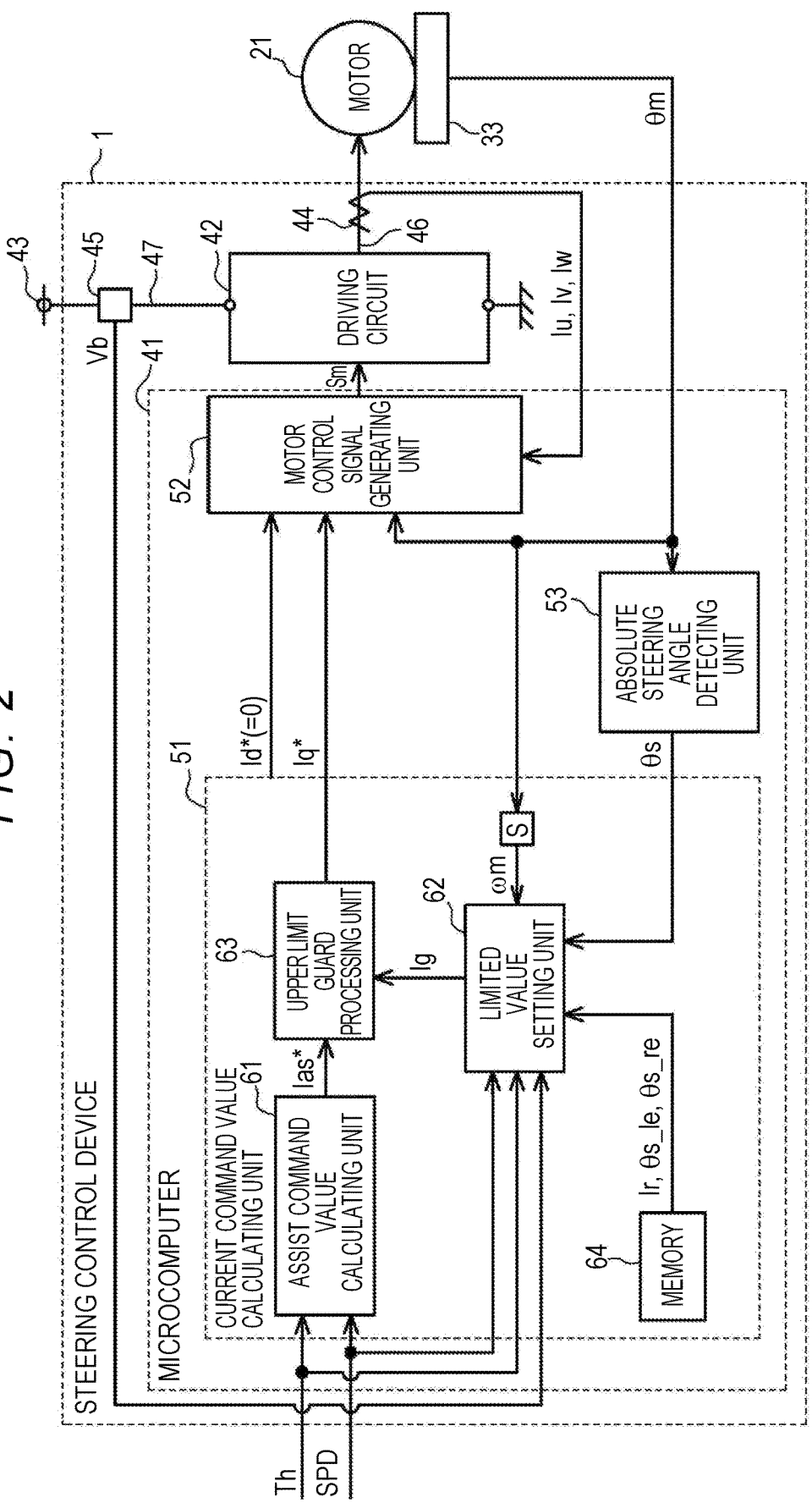
FIG. 2 is a block diagram illustrating a steering control device.

The configuration of the steering control device 1 will be described below. As illustrated in FIG. 2, the steering control device 1 includes a microcomputer 41 that outputs a motor control signal Sm and a drive circuit 42 that supplies drive power to the motor 21 based on the motor control signal Sm. A known PWM inverter including a plurality of switching elements such as FETs is employed as the drive circuit 42 according to this embodiment. The motor control signal Sm which is output from the microcomputer 41 defines ON and OFF states of the switching elements. Accordingly, the switching elements are turned on and off in response to the motor control signal Sm and a power supply pattern to a motor coil of each phase is switched in phases, whereby DC power of an onboard power supply 43 is converted into three-phase drive power and is output to the motor 21.

Control blocks which will be described below are realized by a computer program which is executed by the microcomputer 41, state quantities are detected every predetermined sampling cycle, and calculation processes assigned to the following control blocks are performed every predetermined calculation cycle.

The vehicle speed SPD, the steering torque Th, and the rotation angle θm of the motor 21 are input to the microcomputer 41. Phase current values Iu, Iv, and Iw of the motor 21 which are detected by a current sensor 44 and a source voltage Vb of the onboard power supply 43 which is detected by a voltage sensor 45 are also input to the microcomputer 41. The current sensor 44 is provided in a connection line 46 between the drive circuit 42 and the motor coil of each phase. The voltage sensor 45 is provided in a connection line 47 between the onboard power supply 43 and the drive circuit 42. In FIG. 2, for the purpose of convenience of description, one group of each of the current sensors 44 of the phases and each of the connection lines 46 of the phases is illustrated. The microcomputer 41 outputs a motor control signal Sm based on the input state quantities.

Specifically, the microcomputer 41 includes a current command value calculating unit 51 that calculates current command values Id* and Iq*, a motor control signal generating unit 52 that outputs a motor control signal Sm based on the current command values Id* and Iq*, and an absolute steering angle detecting unit 53 that detects an absolute steering angle θs.

The vehicle speed SPD, the steering torque Th, the source voltage Vb, the rotation angle θm, and the absolute steering angle θs are input to the current command value calculating unit 51. The current command value calculating unit 51 calculates the current command values Id* and Iq* based on the input state quantities. The current command values Id* and Iq* are target values of currents to be supplied to the motor 21 and are a current command value on a d axis and a current command value on a q axis, respectively, in a d/q coordinate system. Among these, the q-axis current command value Iq* represents a target value of a motor torque which is output from the motor 21. In this embodiment, the d-axis current command value Id* is basically fixed to zero. For example, the current command values Id* and Iq* have positive values when steering to the right side is assisted with and have negative values when steering to the left side is assisted with.

The current command values Id* and Iq*, the phase current values Iu, Iv, and Iw, and the rotation angle θm of the motor 21 are input to the motor control signal generating unit 52. The motor control signal generating unit 52 generates the motor control signal Sm by performing current feedback control in the d/q coordinate system based on the input state quantities.

Specifically, the motor control signal generating unit 52 calculates a d-axis current value Id and a q-axis current value Iq which are actual current values of the motor 21 in the d/q coordinate system by mapping the phase current values Iu, Iv, and Iw onto the d/q coordinate system based on the rotation angle θm. Then, the motor control signal generating unit 52 generates the motor control signal Sm by performing current feedback control such that the d-axis current value Id follows the d-axis current command value Id* and the q-axis current value Iq follows the q-axis current command value Iq*.

The motor control signal generating unit 52 outputs the generated motor control signal Sm to the drive circuit 42. Accordingly, drive power based on the motor control signal Sm is supplied to the motor 21 and a motor torque based on the q-axis current command value Iq* is output from the motor 21, whereby an assist force is applied to the steering mechanism 5.

The rotation angle θm is input to the absolute steering angle detecting unit 53. The absolute steering angle detecting unit 53 detects an absolute motor angle which is expressed as an absolute angle including a range exceeding 360° based on the rotation angle θm. The absolute steering angle detecting unit 53 in this embodiment integrates a rotation speed of the motor 21, for example, with an origin at the rotation angle θm when a start switch such as an ignition switch is turned on for the first time after the onboard power supply 43 has been replaced, and detects an absolute motor angle based on the integrated rotation speed and the rotation angle θm. Then, the absolute steering angle detecting unit 53 detects an absolute steering angle θs indicating a steering angle of the steering shaft 11 by multiplying the absolute motor angle by a conversion factor based on a reduction gear ratio of the reduction gear mechanism 22. In the steering control device 1 according to this embodiment, rotation of the motor 21 is monitored even when the start switch is turned off, and the rotation speed of the motor 21 is integrated normally. Accordingly, even when the start switch is turned on a second time or later after the onboard power supply 43 has been replaced, the origin of the absolute steering angle θs is the same as the origin which was set when the start switch was turned on for the first time.

Since the turning angle of the turning wheels 4 is changed by the rotation of the steering shaft 11 as described above, the absolute steering angle θs indicates a rotation angle of a rotation shaft which can be converted to the turning angle of the turning wheels 4. The absolute motor angle and the absolute steering angle θs have positive values when they are angles turned to the right side from the origin and have negative values when they are angles turned to the left side from the origin.

The configuration of the current command value calculating unit 51 will be described below. The current command value calculating unit 51 includes an assist command value calculating unit 61 that calculates an assist command value Ias* which is a base component of the q-axis current command value Iq*. The current command value calculating unit 51 further includes a limit value setting unit 62 that sets a limit value Ig which is an upper limit of the absolute value of the q-axis current command value Iq* and an upper limit guard processing unit 63 that limits the absolute value of the assist command value Ias* to a value equal to or less than the limit value Ig. A memory 64 is connected to the limit value setting unit 62.

The steering torque Th and the vehicle speed SPD are input to the assist command value calculating unit 61. The assist command value calculating unit 61 calculates the assist command value Ias* based on the steering torque Th and the vehicle speed SPD. Specifically, the assist command value calculating unit 61 calculates the assist command value Ias* to have a larger absolute value as the absolute value of the steering torque Th becomes greater and as the vehicle speed SPD becomes lower. The calculated assist command value Ias* is output to the upper limit guard processing unit 63.

The limit value Ig set by the limit value setting unit 62 in addition to the assist command value Ias* is input to the upper limit guard processing unit 63 as will be described later. When the absolute value of the input assist command value Ias* is equal to or less than the limit value Ig, the upper limit guard processing unit 63 outputs the value of the assist command value Ias* to the motor control signal generating unit 52 as the q-axis current command value Iq* without any change. On the other hand, when the absolute value of the input assist command value Ias* is greater than the limit value Ig, the upper limit guard processing unit 63 outputs a value obtained by limiting the absolute value of the assist command value Ias* to the limit value Ig to the motor control signal generating unit 52 as the q-axis current command value Iq*.

The rated current Ir which is a maximum current corresponding to a torque set in advance as a motor torque which can be output from the motor 21, end-position-corresponding angles θs_re and θs_le, and the like are stored in the memory 64. The end-position-corresponding angle θs_le on the left side is the absolute steering angle θs corresponding to the left rack end position, and the end-position-corresponding angle θs_re on the right side is the absolute steering angle θs corresponding to the right rack end position. The end-position-corresponding angles θs_re and θs_le are set, for example, by appropriate learning which is performed based on a driver's steering.

The configuration of the limit value setting unit 62 will be described below. A motor angular velocity ωm which is obtained by differentiating the rotation angle θm, the absolute steering angle θs, the vehicle speed SPD, the steering torque Th, the source voltage Vb, the rated current Ir, and the end-position-corresponding angles θs_re and θs_le are input to the limit value setting unit 62. The limit value setting unit 62 sets the limit value Ig based on the input state quantities.

Figure 3:
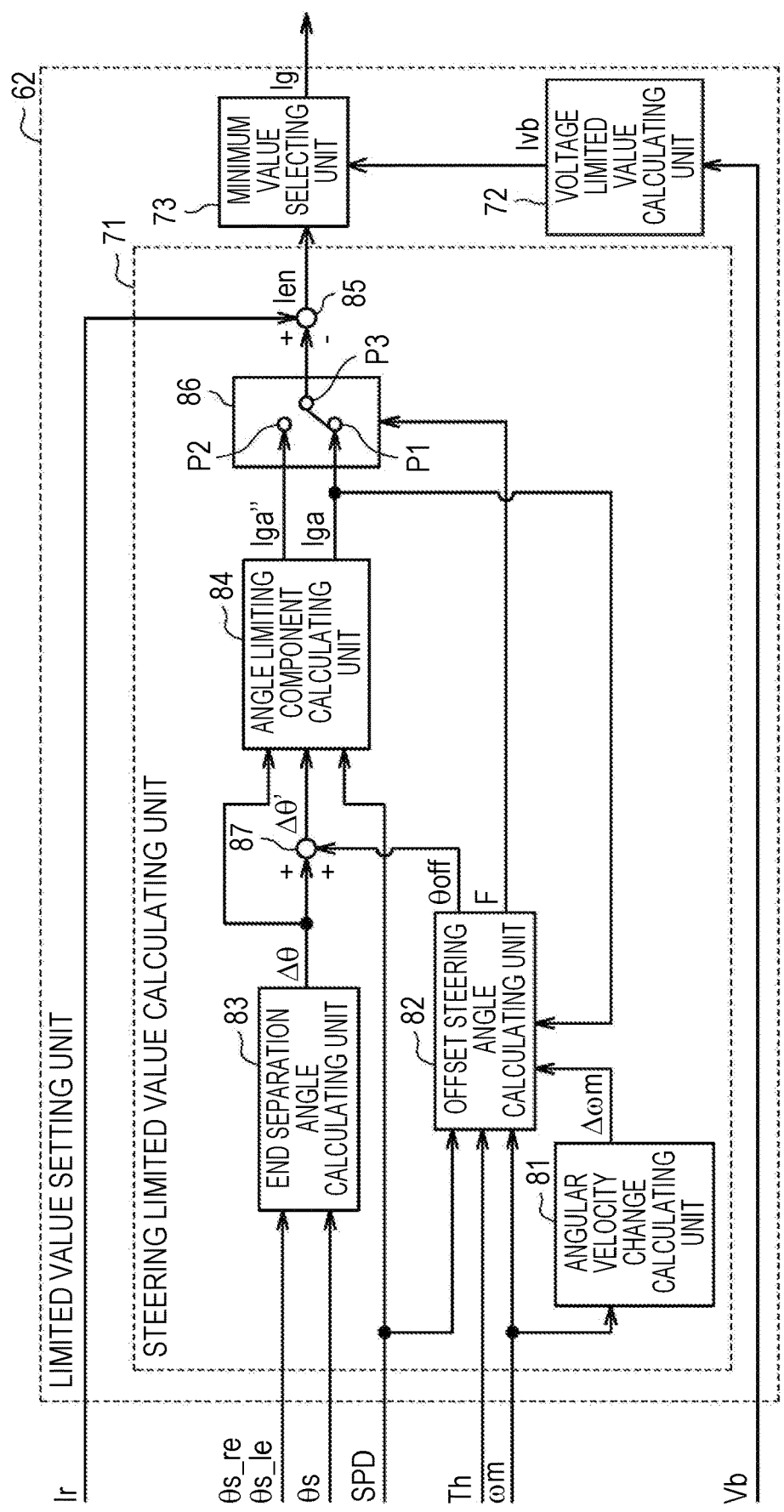
FIG. 3 is a block diagram illustrating a limit value setting unit.

Specifically, as illustrated in FIG. 3, the limit value setting unit 62 includes a steering angle limit value calculating unit 71 that calculates a steering angle limit value Ien based on the absolute steering angle θs, a voltage limit value calculating unit 72 that calculates a voltage limit value Ivb which is another limit value based on the source voltage Vb, and a minimum value selecting unit 73 that selects the smaller of the steering angle limit value Ien and the voltage limit value Ivb.

The motor angular velocity ωm, the absolute steering angle θs, the vehicle speed SPD, the steering torque Th, the rated current Ir, and the end-position-corresponding angles θs_re and θs_le are input to the steering angle limit value calculating unit 71. The steering angle limit value calculating unit 71 calculates the steering angle limit value Ien which decreases with a decrease of an end separation angle Δθ indicating a distance of the absolute steering angle θs from the end-position-corresponding angles θs_re and θs_le based on the input state quantities when the end separation angle Δθ is equal to or less than a predetermined angle θ1 as will be described later. The calculated steering angle limit value Ien is output to the minimum value selecting unit 73.

The source voltage Vb is input to the voltage limit value calculating unit 72. The voltage limit value calculating unit 72 calculates the voltage limit value Ivb which is less than a rated voltage for supplying the rated current Ir when the absolute value of the source voltage Vb is equal to or less than a preset voltage threshold value Vth. Specifically, when the absolute value of the source voltage Vb is equal to or less than the voltage threshold value Vth, the voltage limit value calculating unit 72 calculates the voltage limit value Ivb having an absolute value which decreases with a decrease of the absolute value of the source voltage Vb. The calculated voltage limit value Ivb is output to the minimum value selecting unit 73.

The minimum value selecting unit 73 selects the smaller of the input steering angle limit value Ien and the input voltage limit value Ivb as the limit value Ig and outputs the selected one to the upper limit guard processing unit 63. When the steering angle limit value Ien is output as the limit value Ig to the upper limit guard processing unit 63, the absolute value of the q-axis current command value Iq* is limited to the steering angle limit value Ien. Accordingly, end contact relaxation control for relaxing an impact of end contact is performed by decreasing the absolute value of the q-axis current command value Iq* with the decrease of the end separation angle Δθ when the end separation angle Δθ is equal to or less than the predetermined angle θ1. The current command value calculating unit 51 in this embodiment corrects the q-axis current command value Iq* such that the absolute value of the q-axis current command value Iq* is limited to a value equal to or less than the limit value Ig. The correction value of the q-axis current command value Iq* is an excess of the assist command value Ias* from the limit value Ig, that is, an excess from the steering angle limit value Ien.

When the voltage limit value Ivb is output as the limit value Ig to the guard processing unit 63, the absolute value of the q-axis current command value Iq* is limited to the voltage limit value Ivb. Accordingly, when the absolute value of the source voltage Vb is equal to or less than the voltage threshold value Vth, power supply protection control for decreasing the absolute value of the q-axis current command value Iq* with the decrease of the absolute value of the source voltage Vb is performed.

Here, movement of the rack shaft 12 may be limited at a virtual rack end position which is closer to the neutral steering position than an actual rack end position at which the rack shaft 12 actually comes into contact with the rack housing 13 by execution of end contact relaxation control. In this case, the absolute steering angle θs may be less than that when the rack shaft 12 is located at the actual rack end position, and small-turn performance of the vehicle may deteriorate.

Therefore, the current command value calculating unit 51 in this embodiment performs partial release control for decreasing the correction value of the q-axis current command value Iq* in end contact relaxation control based on the steering torque Th input to the EPS 2 when a driver intends to cause the vehicle to travel while turning at the time of execution of end contact relaxation control. Since the upper limit guard processing unit 63 limits the absolute value of the q-axis current command value Iq* to a value equal to or less than the limit value Ig as described above, the correction value of the q-axis current command value Iq* decreases as the steering angle limit value Ien which is the limit value Ig increases. In consideration of this point, as will be described below, when a driver intends to cause the vehicle to travel while turning at the time of execution of end contact relaxation control, the steering angle limit value calculating unit 71 calculates the steering angle limit value Ien which is greater than that at the time of non-execution of partial release control and thus partial release control is performed in this embodiment.

Specifically, the steering angle limit value calculating unit 71 includes an angular velocity change calculating unit 81 that calculates an angular velocity change Δωm, an offset steering angle calculating unit 82 that calculates an offset steering angle θoff, and an end separation angle calculating unit 83 that calculates the end separation angle Δθ. The steering angle limit value calculating unit 71 includes an angle limiting component calculating unit 84 that calculates a normal angle limiting component Iga based on the end separation angle 40 and a release angle limiting component Iga" based on a release end separation angle Δθ' which is obtained by adding the offset steering angle θoff to the end separation angle Δθ. The steering angle limit value calculating unit 71 further includes an output switching unit 86 that selects one of the angle limiting components Iga and Iga" and outputs the selected one to a subtractor 85, and calculates the steering angle limit value Ien by subtracting one of the angle limiting components Iga and Iga" from the rated current Ir. The control blocks will be sequentially described below.

Angular Velocity Change Calculating Unit 81

A motor angular velocity ωm is input to the angular velocity change calculating unit 81. The angular velocity change calculating unit 81 calculates an angular velocity change Δωm which is an amount of change of the motor angular velocity ωm based on the input motor angular velocity ωm. Then, the angular velocity change calculating unit 81 outputs the angular velocity change Δωm to the offset steering angle calculating unit 82. The angular velocity change calculating unit 81 in this embodiment outputs a value obtained by performing a low-pass filtering process on the angular velocity change λωm to the offset steering angle calculating unit 82.

Offset Steering Angle Calculating Unit 82

The vehicle speed SPD, the steering torque Th, the motor angular velocity ωm, the angular velocity change Δωm, and the normal angle limiting component Iga which will be described later are input to the offset steering angle calculating unit 82. The offset steering angle calculating unit 82 determines whether a driver has an intention of causing the vehicle to travel while turning by performing turning steering or holding steering at the time of execution of end contact relaxation control based on the input state quantities. When it is determined that the driver intends to cause the vehicle to travel while turning at the time of execution of end contact relaxation control, the offset steering angle calculating unit 82 starts calculation of the offset steering angle θoff and outputs the calculated offset steering angle θoff to an adder 87. When it is determined that the driver does not intend to cause the vehicle to travel while turning at the time of execution of end contact relaxation control, the offset steering angle calculating unit 82 does not calculate the offset steering angle θoff.

The offset steering angle calculating unit 82 outputs an execution flag F indicating whether partial release control is being performed to the output switching unit 86. The execution flag F indicates that partial release control is not being performed when the value thereof is "0," and indicates that partial release control is being performed when the value thereof is "1." The offset steering angle calculating unit 82 sets the value of the execution flag F to "0" before calculation of the offset steering angle θoff is started, and sets the value of the execution flag F to "1" after calculation of the offset steering angle θoff has been started.

A method of calculating the offset steering angle θoff will be described below in detail. The offset steering angle calculating unit 82 calculates the offset steering angle θoff based on the steering torque Th using a model formula indicated by Expression (1).

$$|Th| = J \times \ddot{\theta}s^* + C \times \dot{\theta}s^* + K \times \theta s^* \quad (1)$$

In the following description, for the purpose of convenience of description, a sign of a target steering velocity which is a first temporal differential value of "θs*" is referred to as "ωs*" This model formula defines and represents a relationship between the steering torque Th which is input via the steering wheel 3 and a rotation angle of a rotation shaft which can be converted into a turning angle of the turning wheels 4. This model formula is expressed using an elasticity coefficient K which is obtained by modeling specifications such as suspension or wheel alignment of the vehicle in which the EPS 2 is mounted, a viscosity coefficient C which is obtained by modeling friction or the like of the EPS 2, and an inertia coefficient J which is obtained by modeling inertia of the EPS 2.

The offset steering angle calculating unit 82 in this embodiment calculates a target steering velocity ωs* using Expression (2) in which the elasticity coefficient K and the inertia coefficient J are set to zero and the target steering velocity ωs* is defined in consideration of a decrease in calculation load and a steering feeling which is to be realized.

$$\dot{\theta}s* = \frac{|Th|}{C} \quad (2)$$

Then, the offset steering angle calculating unit 82 sets a value obtained by integrating the target steering velocity ωs* as the offset steering angle θoff. The offset steering angle θoff which is calculated in this way is output to the adder 87.

Determination of intention of turning will be described below. The offset steering angle calculating unit 82 determines that a driver intends to cause the vehicle to travel while turning at the time of execution of end contact relaxation control when the following conditions (a) to (e) for determination of intention of turning are satisfied continuously for a predetermined time. The predetermined time is set to an appropriate time in which a driver can be determined to perform turning steering or holding steering.

(a) The normal angle limiting component Iga is greater than a current threshold value Ith1.

(b) The absolute value of the steering torque Th is equal to or greater than a steering torque threshold value Tth.

(c) The vehicle speed SPD is in a predetermined vehicle speed range.

(d) The absolute value of the motor angular velocity ωm is equal to or less than an angular velocity threshold value ωth.

(e) The absolute value of the angular velocity change Δωm which is an amount of change of the motor angular velocity ωm is less than an angular velocity change threshold value Δωth.

The current threshold value Ith1 is set such that a predetermined assist force which is a minimum assist force capable of moving the rack shaft 12 to the rack end position is supplied from the motor 21 when the value of the angle limiting component Iga is the current threshold value Ith1 and the vehicle travels on a normal road surface at a low speed. In other words, the absolute value of the steering angle limit value Ien which is obtained by subtracting the current threshold value Ith1 from the rated current Ir is set to a magnitude at which a predetermined assist force is output from the motor 21 by supplying a current of the same absolute value to the motor 21. The current threshold value Ith1 is a current value based on the rated current Ir and is set to, for example, 50% of the rated current Ir.

The steering torque threshold value Tth is a steering torque which is required to hold steering of the steering wheel 3 when the vehicle is caused to travel while turning in a state in which the rack end 18 is in contact with the rack housing 13, and is set to an appropriate value which is greater than zero. The predetermined vehicle speed range indicates a vehicle speed range which is equal to or greater than a lower-limit vehicle speed Slo indicating that the vehicle is not stopped and which is less than an upper-limit vehicle speed Sup indicating that the vehicle is traveling at a low speed. The lower-limit vehicle speed Slo is set to a value which is slightly greater than zero and the upper-limit vehicle speed Sup is set to an appropriate value which is greater than the lower-limit vehicle speed Slo. The angular velocity threshold value ωth is an angular velocity indicating that the motor 21 is stopped and is set to a value which is slightly greater than zero. The angular velocity change threshold value Δωth is an angular velocity change indicating that the motor 21 does not substantially accelerate nor decelerate and is set to a value which is slightly greater than zero.

When the normal angle limiting component Iga is less than the current threshold value Ith1, for example, by allowing a driver to perform return steering at the time of calculation of the offset steering angle θoff, that is, at the time of execution of partial release control, the offset steering angle calculating unit 82 stops calculation of the offset steering angle θoff. That is, partial release control is stopped.

Figure 4:
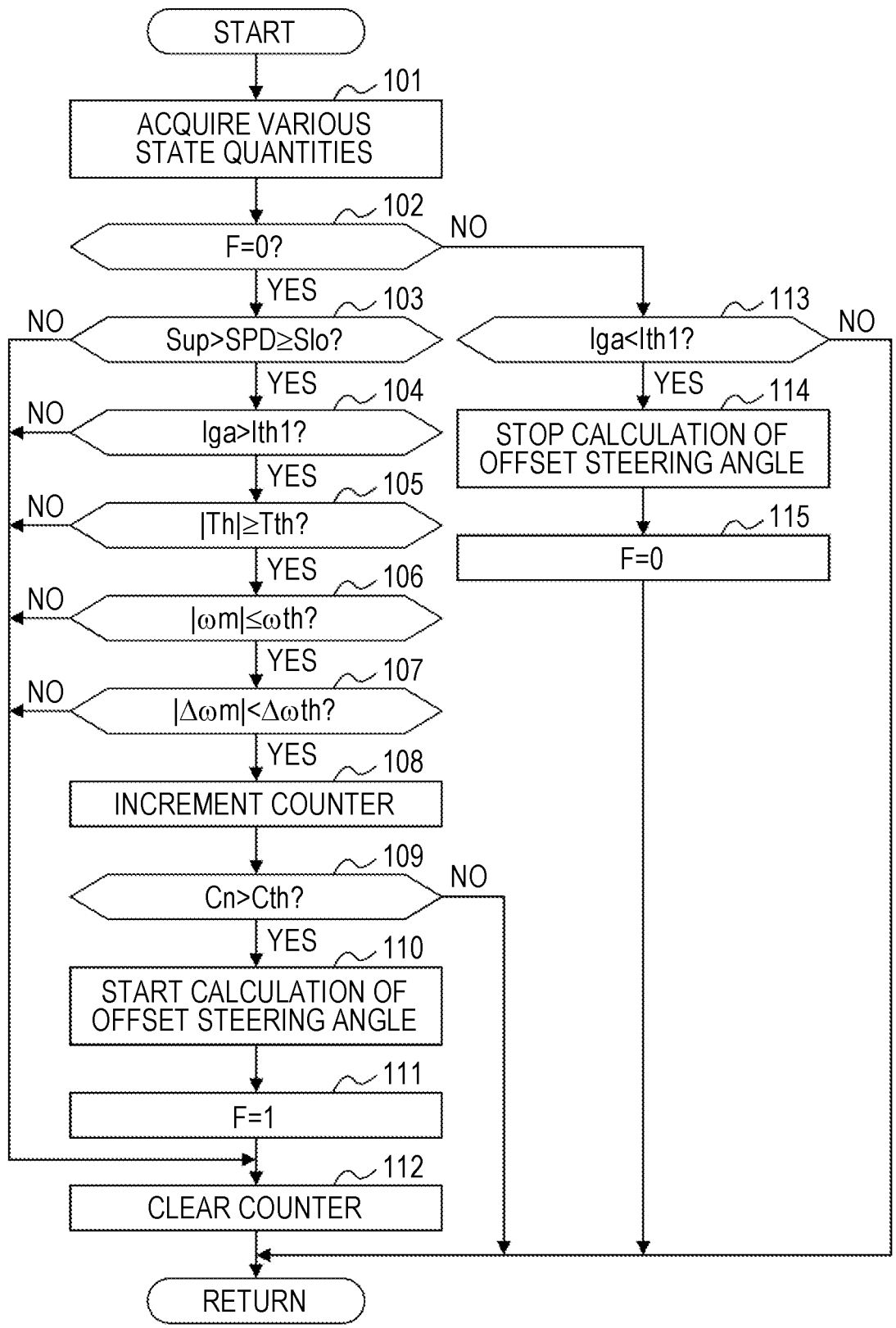
FIG. 4 is a flowchart illustrating a process routine associated with calculation of an offset steering angle which is performed by an offset steering angle calculating unit.

A process flow of calculating the offset steering angle θoff which is performed by the offset steering angle calculating unit 82 will be described below. As illustrated in the flowchart of FIG. 4, when various state quantities are acquired (Step 101), the offset steering angle calculating unit 82 determines whether the execution flag F is "0," that is, whether partial release control is not performed (Step 102).

When the execution flag F is "0" (Step 102: YES), the offset steering angle calculating unit 82 determines whether the vehicle speed SPD is equal to or greater than the lower-limit vehicle speed Slo and less than the upper-limit vehicle speed Sup (Step 103). When the vehicle speed SPD is equal to or greater than the lower-limit vehicle speed Slo and less than the upper-limit vehicle speed Sup and is in a predetermined vehicle speed range (Step 103: YES), the offset steering angle calculating unit 82 determines whether the angle limiting component Iga is greater than the current threshold value Ith1 (Step 104). When the angle limiting component Iga is greater than the current threshold value Ith1 (Step 104: YES), the offset steering angle calculating unit 82 determines whether the absolute value of the steering torque Th is equal to or greater than the steering torque threshold value Tth (Step 105). When the absolute value of the steering torque Th is equal to or greater than the steering torque threshold value Tth (Step 105: YES), the offset steering angle calculating unit 82 determines whether the absolute value of the motor angular velocity ωm is equal to or less than the angular velocity threshold value ωth (Step 106). When the absolute value of the motor angular velocity ωm is equal to or less than the angular velocity threshold value ωth (Step 106: YES), the offset steering angle calculating unit 82 determines whether the angular velocity change Δωm is less than the angular velocity change threshold value Δωth (Step 107). When the angular velocity change Δωm is less than the angular velocity change threshold value Δωth (Step 107: YES), the offset steering angle calculating unit 82 causes the process flow to proceed to Step 108.

In Step 108, the offset steering angle calculating unit 82 increments a count value Cn of a counter indicating an elapsed time after determinations of Steps 103 to 107 have been performed, that is, after the conditions (a) to (e) have been satisfied. Subsequently, the offset steering angle calculating unit 82 determines whether the count value Cn is greater than a predetermined count value Cth corresponding to a predetermined time (Step 109). When the count value Cn is greater than the predetermined count value Cth (Step 109: YES), the offset steering angle calculating unit 82 starts calculation of the offset steering angle θoff (Step 110), sets the value of the execution flag F to "1" indicating that partial release control is being performed, and clears the count value Cn of the counter (Steps 111 and 112).

When the count value Cn is equal to or less than the predetermined count value Cth (Step 109: NO), the offset steering angle calculating unit 82 does not perform processes subsequent thereto. When the determination result of any one of Steps 103 to 107 is not positive (Steps 103 to 107: NO), the offset steering angle calculating unit 82 does not perform the processes of Steps 108 to 111, causes the process flow to proceed to Step 112, and clears the count value Cn.

On the other hand, when the value of the execution flag F is "1" (Step 102: NO), the offset steering angle calculating unit 82 determines whether the angle limiting component Iga which is calculated based on the end separation angle Δθ is less than the current threshold value Ith1 (Step 113). When the angle limiting component Iga is less than the current threshold value Ith1 (Step 113: YES), the offset steering angle calculating unit 82 stops calculation of the offset steering angle θoff (Step 114) and sets the value of the execution flag F to "0" indicating that partial release control is stopped (Step 115). When the angle limiting component Iga is equal to or greater than the current threshold value Ith1 (Step 113: NO), the offset steering angle calculating unit 82 does not perform processes subsequent thereto.

End Separation Angle Calculating Unit 83

As illustrated in FIG. 3, the absolute steering angle θs and the end-position-corresponding angles θs_re and θs_le are input to the end separation angle calculating unit 83. The end separation angle calculating unit 83 calculates a difference between the absolute steering angle θs and the end-position-corresponding angle θs_le on the left side in the newest calculation cycle and a difference between the absolute steering angle θs and the end-position-corresponding angle θs_re on the right side in the newest calculation cycle. Then, the end separation angle calculating unit 83 outputs the smaller absolute value of the calculated differences as the end separation angle Δθ to the angle limiting component calculating unit 84 and an adder 87.

Angle Limiting Component Calculating Unit 84

The end separation angle Δθ and the vehicle speed SPD are input to the angle limiting component calculating unit 84. A release end separation angle Δθ' which is obtained by adding the offset steering angle θoff to the end separation angle Δθ in the adder 87 is input to the angle limiting component calculating unit 84. The release end separation angle Δθ' has a value which is greater by the value of the offset steering angle θoff than the end separation angle Δθ. The angle limiting component calculating unit 84 calculates the angle limiting components Iga and Iga" based on the input state quantities.

Figure 5:
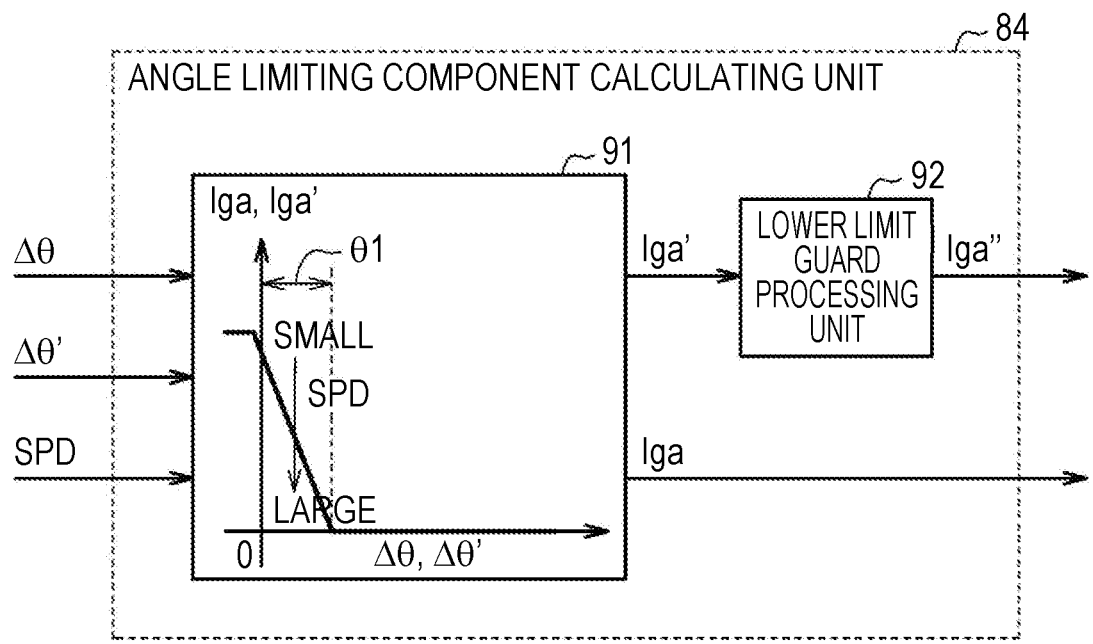
FIG. 5 is a block diagram illustrating an angle limiting component calculating unit.

Specifically, as illustrated in FIG. 5, the angle limiting component calculating unit 84 includes a map calculating unit 91 that calculates the normal angle limiting component Iga and the release angle limiting component Iga' and a lower-limit guard processing unit 92 that defines a lower limit value of the absolute value of the release angle limiting component Iga'.

The map calculating unit 91 includes a normal map in which a relationship between the end separation angle Δθ and the vehicle speed SPD and the normal angle limiting component Iga is defined, and calculates the angle limiting component Iga corresponding to the end separation angle Δθ and the vehicle speed SPD with reference to the map. The calculated normal angle limiting component Iga is output to the offset steering angle calculating unit 82 and the output switching unit 86.

In this normal map, the angle limiting component Iga is set to decrease as the end separation angle Δθ increases from a zero state and to be zero when the end separation angle Δθ is greater than a predetermined angle θ1. In this normal map, an area in which the end separation angle Δθ is negative is also set, and the angle limiting component Iga increases in proportion to a decrease of the end separation angle Δθ when the end separation angle Δθ becomes less than zero and is kept constant after the end separation angle Δθ becomes the rated current Ir. The negative area in the map is assumed to be a degree by which the motor 21 rotates with elastic deformation of the EPS 2 by performing more turning steering in a state in which the rack end 18 is in contact with the rack housing 13. The predetermined angle θ1 is set to a small angle indicating a range close to the end-position-corresponding angles θs_re and θs_le. That is, the angle limiting component Iga is set to decrease when the absolute steering angle θs transitions from the end-position-corresponding angles θs_re and θs_le to the neutral steering position and to be zero when the absolute steering angle θs is located closer to the neutral steering position than to the vicinities of the end-position-corresponding angles θs_re and θs_le.

In this normal map, the angle limiting component Iga is set to decrease with an increase of the vehicle speed SPD in an area in which the end separation angle Δθ is equal to or less than the predetermined angle θ1. Specifically, the angle limiting component Iga is set to be greater than zero when the vehicle speed SPD is in a low-speed area, and the angle limiting component Iga is set to be zero when the vehicle speed SPD is in a middle-speed or high-speed area.

The map calculating unit 91 includes a release map in which a relationship between the release end separation angle Δθ' and the vehicle speed SPD and the release angle limiting component Iga' is defined, and calculates the release angle limiting component Iga' corresponding to the release end separation angle Δθ' and the vehicle speed SPD with reference to the map. The calculated release angle limiting component Iga' is output to the lower-limit guard processing unit 92.

The release map is set to be the same map as the normal map. That is, when the vehicle speed SPD is the same and the end separation angle ΔO and the release end separation angle Δθ' are the same, the angle limiting component Iga and the release angle limiting component Iga' which are calculated as a result are the same. Since the release end separation angle Δθ' has a value which is greater than the offset steering angle θoff than the end separation angle Δθ as described above, the map calculating unit 91 calculates the release steering angle limit value Ien' which is less by the offset steering angle θoff than the normal steering angle limit value Ien.

The lower-limit guard processing unit 92 adjusts the release angle limiting component Iga' such that the steering angle limit value Ien is not equal to or greater than a preset limitation threshold value Ith2 at the time of execution of partial release control. The limitation threshold value Ith2 is set to a value at which the predetermined assist force is applied from the motor 21 by supplying a current of the same limitation threshold value Ith2 to the motor 21, and is set to the same value as the current threshold value Ith1. The lower-limit guard processing unit 92 adjusts the angle limiting component Iga' based on the result of comparison between the angle limiting component Iga' and the current threshold value Ith1.

Specifically, when the absolute value of the input release angle limiting component Iga' is equal to or greater than the preset current threshold value Ith1, the lower-limit guard processing unit 92 outputs the value of the release angle limiting component Iga' as the release angle limiting component Iga" to the output switching unit 86 without any change. On the other hand, when the absolute value of the input release angle limiting component Iga' is less than the current threshold value Ith1, the lower-limit guard processing unit 92 outputs a value obtained by changing the absolute value of the angle limiting component Iga' to the current threshold value Ith1 as the release angle limiting component Iga" to the output switching unit 86.

Accordingly, since the release angle limiting component Iga" which is output to the output switching unit 86 is equal to or greater than the current threshold value Ith1, the steering angle limit value Ien is not equal to or greater than the limitation threshold value Ith2 when the release angle limiting component Iga" is subtracted from the rated current Jr, that is, at the time of execution of partial release control.

Output Switching Unit 86

As illustrated in FIG. 3, the angle limiting components Iga and Iga" and the execution flag F are input to the output switching unit 86. The output switching unit 86 includes a contact point P1 to which the normal angle limiting component Iga is input, a contact point P2 to which the release angle limiting component Iga" is input, and a contact point P3 which is connected to a subtractor 85. When the execution flag F is "0," the output switching unit 86 connects the contact point P1 and the contact point P3 and outputs the normal angle limiting component Iga to the subtractor 85. On the other hand, when the execution flag F is "1," the output switching unit 86 connects the contact point P2 and the contact point P3 and outputs the release angle limiting component Iga" to the subtractor 85.

Then, from the subtractor 85, a value which is obtained by subtracting the normal angle limiting component Iga or the release angle limiting component Iga" from the rated current Ir depending on whether partial release control is being performed is output as the steering angle limit value Ien to the minimum value selecting unit 73.

Figure 6:
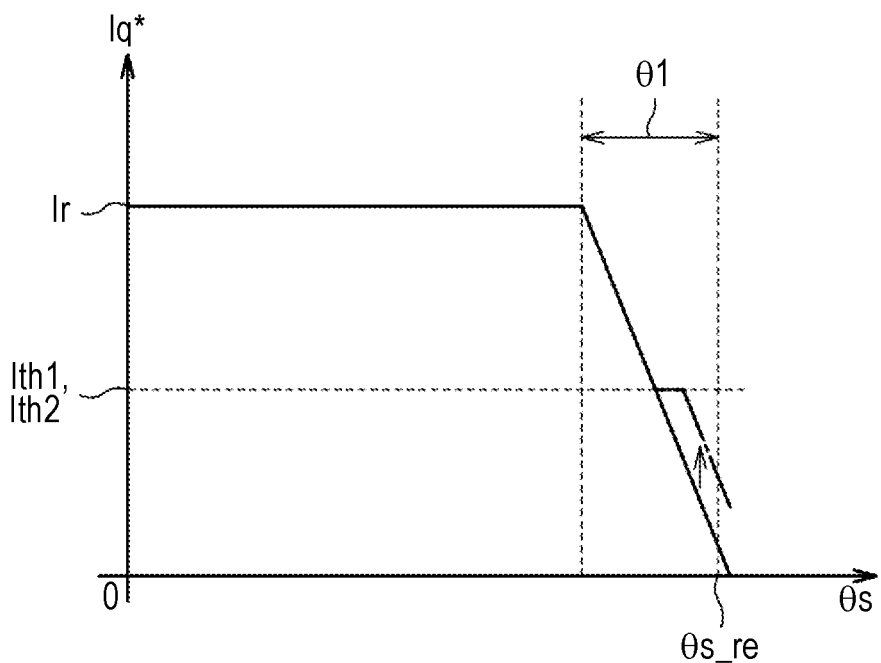
FIG. 6 is a graph illustrating an example of change in a q-axis current command value in partial release control.

Operations of this embodiment will be described below. It is assumed that a driver steers the steering wheel 3 to the right side in a state in which the onboard power supply 43 is normal and power supply protection control is not performed. As illustrated in FIG. 6, when the end separation angle 40 is equal to or less than the predetermined angle θ1, the steering angle limit value Ien with a value which is less than the rated current Ir is calculated. When the steering angle limit value Ien is less than the current threshold value Ith1, turning of the turning wheels 4 may be stopped at a virtual rack end position which is prior to the actual rack end position depending on a road surface state or the like.

Here, when the driver continues to perform steering to the right side and it is determined that the driver has an intention of turning the vehicle, the steering angle limit value Ien is increased and the correction value of the q-axis current command value Iq* is decreased by performing partial release control. That is, since the absolute value of the q-axis current command value Iq* increases as indicated by an alternate long and short dashes line in the drawing, the rack shaft 12 can be moved to the actual rack end position. At this time, since the steering angle limit value Ien is not equal to or greater than the limitation threshold value Ith2 as described above, strong contact of the rack shaft 12 with the rack housing 13 is curbed.

Advantages in this embodiment will be described below. When it is determined that a driver intends to cause the vehicle to travel while turning at the time of execution of end contact relaxation control, the current command value calculating unit 51 performs partial release control for decreasing the correction value of the q-axis current command value Iq* due to execution of end contact relaxation control based on the steering torque Th. Accordingly, limitation of the q-axis current command value Iq* due to execution of end contact relaxation control is partially released, and the q-axis current command value Iq* is increased. Accordingly, for example, even when movement of the rack shaft 12 is limited at the virtual rack end position due to execution of end contact relaxation control, partial release control is performed to increase the q-axis current command value Iq* by allowing the driver to cause the vehicle to travel while turning and thus the rack shaft 12 can be moved to the actual rack end position. As a result, it is possible to curb a decrease in small-turn performance of the vehicle. In this embodiment, since the correction value is decreased, that is, the q-axis current command value Iq* is increased, based on the steering torque Th, it is possible to prevent a driver from feeling discomfort due to execution of partial release control.

The current command value calculating unit 51 includes the steering angle limit value calculating unit 71 that calculates the steering angle limit value Ien which decreases with a decrease of the end separation angle 40 when the end separation angle 40 is equal to or less than the predetermined angle θ1. The current command value calculating unit 51 performs end contact relaxation control by limiting the absolute value of the q-axis current command value Iq* to the steering angle limit value Ien. Accordingly, the correction value of the q-axis current command value Iq* due to execution of end contact relaxation control decreases as the steering angle limit value Ien increases. The steering angle limit value calculating unit 71 includes the angle limiting component calculating unit 84 that calculates the normal angle limiting component Iga and the release angle limiting component Iga", and calculates a value which is obtained by subtracting the normal angle limiting component Iga or the release angle limiting component Iga" from the rated current Ir as the steering angle limit value Ien. Accordingly, by setting the release angle limiting component Iga" to be less than the normal angle limiting component Iga, it is possible to easily perform partial release control for decreasing the correction value of the q-axis current command value Iq*.

At the time of execution of partial release control, the steering angle limit value calculating unit 71 calculates the target steering velocity ωs* based on the steering torque Th using Expression (2) and calculates the offset steering angle θoff based on a value obtained by integrating the target steering velocity ωs*. The steering angle limit value calculating unit 71 calculates the release angle limiting component Iga" which is less than the normal angle limiting component Iga based on the offset steering angle θoff. Specifically, the steering angle limit value calculating unit 71 calculates the release angle limiting component Iga" based on the release end separation angle 40' which is obtained by adding the offset steering angle θoff to the end separation angle Δθ. Here, the offset steering angle θoff has a value which is close to the absolute steering angle θs which is generated when the steering torque Th is input to the model expressed by the model formula, that is, the model of the EPS 2 which is expressed by the viscosity coefficient C in this embodiment. Accordingly, by calculating the release angle limiting component Iga" based on the offset steering angle θoff, it is possible to suitably increase the q-axis current command value Iq* such that a steering feeling corresponding to the model of the EPS 2 is realized.

Since the steering angle limit value calculating unit 71 calculates the steering angle limit value Ien such that the steering angle limit value Ien is not equal to or greater than the limitation threshold value Ith2 at the time of execution of partial release control, it is possible to curb an excessive increase of the q-axis current command value Iq* due to execution of partial release control. Accordingly, for example, even when end contact in which the rack shaft 12 comes into contact with the rack housing 13 occurs, it is possible to curb an increase of an impact thereof as the result of execution of partial release control.

When the normal angle limiting component Iga is less than the current threshold value Ith1, the steering angle limit value calculating unit 71 stops partial release control. Accordingly, for example, as in the case in which partial release control is stopped in a state in which the normal angle limiting component Iga is equal to or greater than the current threshold value Ith1, it is possible to prevent a sudden change of the steering angle limit value Ien, that is, the q-axis current command value Iq*, and to curb deterioration of a steering feeling.

The above embodiment can be modified as follows. The above embodiments and the following modified examples can be combined unless technical confliction arises. In the embodiment, the release end separation angle Δθ' is calculated by adding the offset steering angle θoff to the end separation angle Δθ. However, the disclosure is not limited thereto and, for example, a release absolute steering angle θs' may be calculated by subtracting the offset steering angle θoff from the absolute steering angle θs and a value indicating a distance of the absolute steering angle θs' from the end-position-corresponding angles θs_re and θs_le may be calculated as the release end separation angle Δθ'.

In the above embodiment, for example, a configuration in which the map calculating unit 91 includes a normal map and a release map in which the horizontal axis of the normal map is offset depending on the offset steering angle θoff and the release end separation angle Δθ' is not input to the map calculating unit 91 may be employed. With this configuration, since the horizontal axis in the release map is offset depending on the offset steering angle θoff, the release angle limiting component Iga" which is less than the normal angle limiting component Iga can also be calculated similarly to the embodiment.

In the above embodiment, partial release control is stopped when the normal angle limiting component Iga becomes less than the current threshold value Ith1 due to execution of partial release control after partial release control has been performed. However, the disclosure is not limited thereto and partial release control may be stopped when the angle limiting component Iga is equal to or greater than the current threshold value Ith1, for example, when one of the conditions (a) to (e) is not satisfied.

In the above embodiment, the steering angle limit value Ien may be equal to or greater than the limitation threshold value Ith2 at the time of execution of partial release control. In the above embodiment, the target steering velocity ωs* is calculated using Expression (2) in a state in which the elasticity coefficient K and the inertia coefficient J are set to zero, but the disclosure is not limited thereto and, for example, at least one of the elasticity coefficient K and the inertia coefficient J may not be set to zero. In this case, the target steering velocity ωs* can be calculated, for example, using an actual absolute steering angle θs and a steering angular velocity in addition to the steering torque Th. Instead of using the model formula, for example, a map indicating a relationship between the steering torque Th and the offset steering angle θoff may be set and the offset steering angle θoff corresponding to the steering torque may be calculated with reference to the map.

In the above embodiment, when the conditions (a) to (e) are satisfied continuously for a predetermined time, it is determined that a driver intends to cause the vehicle to travel while turning at the time of execution of end contact relaxation control and partial release control is performed, but the disclosure is not limited thereto and the starting conditions for partial release control can be appropriately changed. For example, when the conditions (a) to (e) are satisfied, it may be determined that a driver intends to cause the vehicle to travel while turning regardless of whether the conditions are satisfied continuously for the predetermined time. For example, it may not be determined whether one of the conditions (d) and (e) is satisfied and it may be determined whether a yaw rate of the vehicle is equal to or greater than a yaw rate threshold value indicating a turning state instead of the condition (c). In addition, in the conditions (d) and (e), the steering velocity ωs may be used instead of the motor angular velocity ωm.

In the above embodiment, when it is determined that a driver intends to cause the vehicle to travel while turning at the time of execution of end contact relaxation control, a great steering angle limit value Ien is calculated and the correction value of the q-axis current command value Iq* is decreased by subtracting the release angle limiting component Iga" which is less than the normal angle limiting component Iga from the rated current Ir. However, the disclosure is not limited thereto and the correction value of the q-axis current command value Iq* may be decreased by directly correcting the value of the steering angle limit value Ien such that the steering angle limit value Ien increases at the time of execution of partial release control, and the way of performing partial release control can be appropriately modified.

In the embodiments, by monitoring the rotation of the motor 21 even when the ignition switch is turned off, the rotation speed of the motor 21 from the origin is normally integrated, and the absolute motor angle and the absolute steering angle θs are calculated. However, the disclosure is not limited thereto and, for example, a steering sensor that detects a steering angle as an absolute angle may be provided, the rotation speed of the motor 21 from the origin may be integrated based on the steering angle detected by the steering sensor and the reduction gear ratio of the reduction gear mechanism 22, and the absolute motor angle and the absolute steering angle θs may be calculated.

In the above embodiment, end contact relaxation control is performed by limiting the assist command value Ias* to the steering angle limit value Ien, but the disclosure is not limited thereto and end contact relaxation control may be performed, for example, by adding a steering reaction component which increases toward the rack end position, that is, a component with a sign opposite to the sign of the assist command value Ias*, to the assist command value Ias*. With this configuration, when it is determined that a driver intends to cause the vehicle to travel while turning at the time of execution of end contact relaxation control, the correction value of the q-axis current command value Iq* can be decreased by decreasing the steering reaction component depending on the steering torque Th.

In the above embodiment, a guard process of limiting the absolute value of the assist command value Ias* to a value equal to or less than the limit value Ig is performed on the assist command value Ias*, but the disclosure is not limited thereto and, for example, the guard process may be performed on a value obtained by correcting the assist command value Ias* using a compensation value based on a torque differential value obtained by differentiating the steering torque Th.

In the embodiments, the limit value setting unit 62 includes the voltage limit value calculating unit 72 that calculates the voltage limit value Ivb based on the source voltage Vb, but the disclosure is not limited thereto and another calculation unit that calculates another limit value based on another state quantity may be provided in addition to or instead of the voltage limit value calculating unit 72. A configuration in which the limit value setting unit 62 does not include the voltage limit value calculating unit 72 and sets the steering angle limit value Ien as the limit value Ig without any change may be employed.

In the above embodiment, a value obtained by subtracting the normal angle limiting component Iga or the release angle limiting component Iga" from the rated current Jr is used as the steering angle limit value Ien, but the disclosure is not limited thereto and a value obtained by subtracting the angle limiting component Iga or the release angle limiting component Iga" and an amount of current limitation which is determined by the motor angular velocity from the rated current Jr may be used as the steering angle limit value Ien.

In the embodiments, the steering control device 1 controls the EPS 2 of a type in which the EPS actuator 6 applies a motor torque to the column shaft 15, but the disclosure is not limited thereto and, for example, the steering control device 1 may control a steering system of a type in which a motor torque is applied to the rack shaft 12 via a ball screw nut. Not limited to the EPS, the steering control device 1 may control a steer-by-wire type steering device in which transmission of power between a steering unit which is operated by a driver and a turning unit that turns the turning wheels is cut off and end contact relaxation control may be performed on a torque command value or a q-axis current command value of a motor of a turning actuator which is provided in the turning unit as in this embodiment.

A technical idea which can be understood from the above embodiment and the above modified examples will be additionally described below: A steering control device in which the steering angle limit value calculating unit calculates the release angle limiting component based on the release end separation angle which is obtained by adding the offset steering angle to the end separation angle at the time of execution of partial release control.

What is claimed is:

1. A steering control device for a steering system including a housing, a turning shaft which is accommodated in the housing such that the turning shaft is able to reciprocate, and an actuator which applies a motor torque for causing the turning shaft to reciprocate using a motor as a drive source, the steering control device comprising an electronic control unit, wherein the electronic control unit is configured to:
   detect an absolute steering angle which is a rotation angle of a rotation shaft which is able to be converted into a turning angle of turning wheels connected to the turning shaft and which is expressed as an absolute angle including a range exceeding 360°;
   calculate a current command value corresponding to a target value of the motor torque which is output from the motor;
   control activation of the motor such that an actual current value which is supplied to the motor reaches the current command value;
   store an end-position-corresponding angle which is an angle indicating an end position at which movement of the turning shaft is limited due to end contact in which the turning shaft comes into contact with the housing and which is correlated with the absolute steering angle;
   perform end contact relaxation control for correcting the current command value such that a decrease of an end separation angle indicating a distance of the absolute steering angle from the end-position-corresponding angle is limited when the end separation angle is equal to or less than a predetermined angle;
   make a determination as to whether a vehicle is intended to travel while turning at the time of execution of the end contact relaxation control based on a steering torque which is input into the steering system being greater than a threshold torque value; and
   when the vehicle is, based on the determination, intended to travel while turning at the time of execution of the end contact relaxation control, perform partial release control for decreasing a correction value of the current command value due to execution of the end contact relaxation control based on the steering torque which is input to the steering system.

2. The steering control device according to claim 1, wherein the electronic control unit is configured to:
   calculate a steering angle limit value which decreases with a decrease of the end separation angle when the end separation angle is equal to or less than the predetermined angle;
   perform the end contact relaxation control by limiting an absolute value of the current command value to the steering angle limit value;
   calculate an angle limiting component which decreases with an increase of the end separation angle and calculate the steering angle limit value based on a value which is obtained by subtracting the angle limiting component from a rated current of the motor; and
   calculate the angle limiting component such that the angle limiting component decreases at the time of execution of the partial release control in comparison with a case in which the partial release control is not performed.

3. The steering control device according to claim 2, wherein the electronic control unit is configured to:
   calculate a target steering velocity based on the steering torque using a model formula for correlating the steering torque with the rotation angle at the time of execution of the partial release control;
   calculate an offset steering angle based on a value which is obtained by integrating the target steering velocity; and
   decrease the angle limiting component based on the offset steering angle.

4. The steering control device according to claim 3, wherein the electronic control unit is configured to calculate the steering angle limit value such that the steering angle limit value is not equal to or greater than a preset limitation threshold value at the time of execution of the partial release control.

5. The steering control device according to claim 2, wherein the electronic control unit is configured to calculate the steering angle limit value such that the steering angle limit value is not equal to or greater than a preset limitation threshold value at the time of execution of the partial release control.

6. The steering control device according to claim 1, wherein
   the end contact relaxation control limits movement of the turning shaft at a virtual rack end position that is closer than the end position to a neutral steering position.

* * * * *